Patented July 3, 1951

2,559,085

UNITED STATES PATENT OFFICE 2,559,085

PREPARATION OF N-SUBSTITUTED-N'-NITROGUANIDINES

Arthur Ferguson McKay, Kingston, Ontario, Canada, assignor to The Honorary Advisory Council for Scientific and Industrial Research, Ottawa, Ontario, Canada, a corporation of the Dominion of Canada No Drawing. Application October 22, 1948, Serial No. 56,053

6 Claims. (Cl. 260—565)

This application is a continuation-in-part of United States application Serial No. 782,452, filed October 27, 1947 (now abandoned).

This invention relates to the production of N-substituted-N'-nitroguanidines of new composition, namely: N-phenyl-N'-nitroguanidine having substituted or unsubstituted phenyl groups N-phenylethyl-N'-nitroguanidine, and N-cyclohexyl-N'-nitroguanidine.

It is the object of this invention to produce N-substituted N'-nitroguanidines by a process which comprises reacting a compound of the general formula

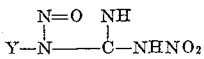

wherein Y is lower alkyl with a primary amine of the group consisting of lower alkyl, phenyl-lower alkyl, cycloalkyl, and monocyclic-carbocyclic-aromatic primary amines.

Certain substituted nitroguanidines, such as methyl, dimethyl, butyl, iso-butyl and isoamyl nitroguanidines, have been produced by the nitration of alkyl guanidine nitrates or sulphates and also by the reaction of nitroguanidines with the appropriate amine, such as primary methyl amine, primary butyl amine, primary iso-butyl amine, primary isoamyl amine, or secondary dimethyl amine.

The new compounds, N-substituted or N-unsubstituted N-phenyl-N' - nitroguanidines, N-phenylethyl-N'-nitroguanidine, and N - cyclohexyl-N'-nitroguanidine have been successfully obtained by the use of a novel compound consisting of a primary amino N-substituted-N'-nitroguanidine, e. g., N-methyl-N-nitroso-N'-nitroguanidine, N-ethyl-N-nitroso-N'-nitroguanidine, N-propyl-N-nitroso - N' - nitroguanidine, or N-butyl-N-nitroso-N'-nitroguanidine prepared as described in this application and in copending United States application Serial No. 782,453, filed on the 27th day of October 1947 (now abandoned), by reacting N-methyl, N-ethyl, N-propyl, or N-butyl-N'-nitroguanidine dissolved in concentrated acid and diluted in water with an aqueous "solution of an" alkali metal nitrite.

The invention comprises the replacement of the substituted nitrosamino group in N-substituted-N-nitroso-N'-nitroguanidines by a substituted amino group preferably substituted or unsubstituted phenylamino, B-phenylethylamino, or cyclohexylamino. The compounds may be prepared by reacting the appropriate amine with N-substituted-N-nitroso-N'-nitroguanidine in the presence of water, water and ether, or aqueous ethanol, at or below room temperature.

Preparation of the compounds is illustrated by the following equation:

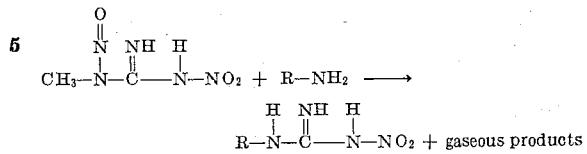

R representing either a phenyl, a substituted phenyl, phenylethyl, cyclohexylamino, other primary amine group, or aralkylamino group.

In accordance with the invention an aqueous solution of the appropriate amine is reacted with, e. g., N-methyl-N-nitroso-N'-nitroguanidine in the presence of water, water and ether, or aqueous ethanol. The reaction is preferably carried out at, or below room temperature, but this temperature is not highly critical and the reaction may be carried out at temperatures between about 5° C. and 80° C. The reaction period varies from several minutes to several days. Upon completion of the reaction the product is recovered by cooling the mixture to a temperature of 0° C. to 7° C. The precipitate of substituted nitroguanidine is then filtered and washed.

Rate of reaction of primary amines with N-substituted-N-nitroso-N'-nitroguanidine is dependent upon the solvent used. The reaction increases with an increase in solvent polarity. With solvent as the only variable, aniline for example, required 2700 minutes to react with nitrosamine compound in an ether-water medium. With 50% "aqueous" ethanol as solvent the reaction required only 63 minutes. The reaction in pure water is very slow because of low solubility of aniline in the water.

If during reaction, the solvent, the concentration of N-substituted-N-nitroso-N'-nitroguanidine, and the temperature are maintained constant the velocity of the reaction will vary directly with the concentration of the amine.

It should be noted that o-chloroaniline can be reacted with N-substituted-N-nitroso-N'-nitroguanidine in the presence of aqueous ethanol only as solvent.

Yields of the compounds according to the invention have been as high as 97%. For example, N - β - phenylethyl-n'-nitroguanidine and N-methylphenyl-N'-nitroguanidine have been produced at a yield of 93% and 97% of the theoretical yield respectively.

The process may be performed in a reaction vessel constructed of materials, such as glass, inactive to the reagents or products of reaction.

There must be provided in the apparatus a means of stirring, temperature control, temperature recording and also an outlet for the gases evolved during the reaction.

The N-substituted and N-unsubstituted-N'-nitroguanidines described herein are useful, for example, as an intermediate in the preparation of synthetic antibiotics, antihistamine substances, insecticides or other useful biologically active materials.

The following examples are given by way of illustration:

EXAMPLE I

N-phenyl-N'-nitroguanidine

PROCEDURE A

Two parts of N-methyl-N-nitroso-N'-nitroguanidine covered with 5 parts of water were treated with 1.4 parts of aniline suspended in 5 parts of water. A slow evolution of gas occurred at room temperature. After standing at room temperature for about sixteen hours with occasional stirring, a solid mass contaminated with aniline had formed. The solid was filtered off and washed with water (20 parts) and cold 95% ethanol (6 parts). The remaining white solid melted at 149–152° C. The yield was 1.6 parts by weight (66 per cent of the theoretical). This material after one recrystallization from 95% ethanol melted at 152–153° C.

PROCEDURE B

Dissolved 11.1 grams of aniline in 150 cc. of ether and added 30 cc. of water. After standing at room temperature for several days crystals separated. These crystals were of high purity, melting at 152–153° C. The yield was 7.65 g. or seventy-eight per cent.

With ethanol as the solvent the reaction occurred in less than two and a half hours. The yield was about 85% of the theoretical.

EXAMPLE II

N-(β-phenylethyl)-N'-nitroguanidine

Seven and two-tenths grams of β-phenylethylamine were dissolved in 75 cc. of ether and 15 cc. of water was added. The reaction mixture was left at room temperature for thirty minutes. Then the crystals were filtered off and washed with ether. The yield was 5.20 grams or 93% of the theoretical and the M. P. was 162–163° C.

EXAMPLE III

N-(o-methoxyphenyl)-N'-nitroguanidine

Dissolved 11 g. of o-anisidine in 50 cc. of ether and added 20 cc. of water and 5 g. of N-methyl-N-nitroso-N'-nitroguanidine. The reaction mixture stood for four days at room temperature before crystals appeared. These crystals melted at 136–137° C. The yield was 89.2% of the theoretical.

EXAMPLE IV

N-(m-methoxyphenyl)-N'-nitroguanidine

Eleven grams of m-anisidine were dissolved in 50 cc. of ether and water (20 cc.) and N-methyl-N-nitroso-N'-nitroguanidine (5 g.) were added. After standing at room temperature for two days, the crystals were recovered by filtration. These crystals melted at 155–156° C. The yield was 92.5% of the theoretical.

EXAMPLE V

N-(p-methoxyphenyl)-N'-nitroguanidine

To eleven grams of p-anisidine dissolved in 50 cc. of ether, 20 cc. of water and 5 g. of N-methyl-N-nitroso-N'-nitroguanidine were added. After standing one and one half hours at room temperature the crystals were removed by filtration. These crystals melted at 154–155° C. The yield was 92.5% of the theoretical.

EXAMPLE VI

N-(p-bromophenyl)-N'-nitroguanidine

Thirteen and seven-tenths grams of p-bromoaniline were dissolved in 50 cc. of ether and 20 cc. of water added. After the addition of 5 g. of N-methyl-N-nitroso-N'-nitroguanidine, the mixture was allowed to stand at room temperature for five days. The crystals were filtered off and had a melting point of 189.5–190.2° C. The yield was 90% of the theoretical.

EXAMPLE VII

N-(p-methylphenyl)-N'-nitroguanidine

To 9.6 g. of p-toluidine dissolved in 50 cc. of ether, 20 cc. of water and 5 g. of N-methyl-N-nitroso-N'-nitroguanidine were added. The reaction mixture stood at room temperature for one day after which the crystals were recovered by filtration. The product melted at 166–166.7° C. The yield was 97% of the theoretical.

EXAMPLE VIII

N-(p-ethoxyphenyl)-$N^1$-nitroguanidine

Six and two-tenths parts by weight of p-phenetidine were dissolved in 25 parts of ether and 10 parts of water were added. After the addition of 2.5 parts of N-methyl-N-nitroso-$N^1$-nitroguanidine, the reaction mixture was left standing at room temperature for four hours. The crystals present at the ether-water interface were recovered by filtration and washed with ether. The yield was 83% of the theoretical and the crystals melted at 172.5–173.5° C.

EXAMPLE IX

N-(m-ethoxyphenyl)-$N^1$-nitroguanidine

Six and two-tenths parts by weight of m-phenetidine were dissolved in 25 parts of ether and 10 parts of water were added. After the addition of 2.5 parts of N-methyl-N-nitroso-$N^1$-nitroguanidine, the reaction mixture was left standing at room temperature for forty-one hours. The crystals present at the ether-water interface were recovered by filtration and washed with ether. The yield was 89% of the theoretical and the crystals melted at 135–136° C.

EXAMPLE X

N-(o-ethoxyphenyl)-$N^1$-nitroguanidine

Six and two-tenths parts by weight of o-phenetidine were dissolved in 25 parts of ether and 10 parts of water were added. After the addition of 2.5 parts of N-methyl-N-nitroso-$N^1$-nitroguanidine, the reaction mixture was left standing at room temperature for three days. The crystals present at the ether-water interface were recovered by filtration and washed with ether. The yield was 57% of the theoretical and the crystal melted at 125–126° C. Extending the reaction over a longer period of time increases such a yield to about 89%.

EXAMPLE XI

*N-(p-methoxyphenyl)-$N^1$-nitroguanidine*

To an ether solution containing 620 mg. of p-anisidine in 7 cc. of ether were added 4 cc. of water and 350 mg. of N-butyl-N-nitroso-$N^1$-nitroguanidine. After thirty minutes standing at room temperature all of the N-butyl-N-nitroso-$N^1$-nitroguanidine had disappeared and seven hours later crystals of N-(p-methoxyphenyl)-$N^1$-nitroguanidine were present. These crystals were filtered off and washed with ether. The yield was 70 per cent of the theoretical and the crystals melted at 154–155° C.

EXAMPLE XII

*N-cyclohexyl-N'-nitroguanidine*

A reaction mixture consisting of 15.6 parts of cyclohexylamine and 5.47 parts of N-ethyl-N-nitroso-N'-nitroguanidine in 35 parts of 50% "aqueous" ethanol was allowed to stand at room temperature for one hour. The reaction mixture was then poured into 200 parts of water and the resulting solution acidified with HCl solution. The crystalline N-cyclohexyl-N'-nitroguanidine was filtered off and washed with water. The yield was 31.3 parts or 49.3% of the theoretical and the crystals melted at 170–171° C. One recrystallization from 95% ethanol raised the melting point to 197°–198° C.

The above described process has also been successfully applied in the preparation of other new N-substituted-N'-nitroguanidines, such as N-m-methylphenyl, N-2,5-dimethylphenyl, N-2, methyl-5-isopropylphenyl, N-m-bromophenyl, N-o-chlorophenyl, N-m-chlorophenyl, N-p-chlorophenyl, and N-p-acetamidophenyl-N'-nitroguanidines by reacting N-methyl, N-ethyl, N-propyl or N-butyl-N-nitroso-N'-nitroguanidines with the corresponding primary amine in the presence of water, ether and water, "aqueous" ethanol, or an "aqueous" alcoholic solvent.

EXAMPLE XIII

*N-m-methylphenyl-$N^1$-nitroguanidine*

To 9.6 parts of M-toluidine in 35 parts of 50% aqueous ethanol were added 5 parts of N-methyl-N-nitroso-N'-nitroguanidine. After the reaction mixture had remained at 32° C. for one and one half hours, it was poured into 200 parts of water. The product was filtered off and washed with ether. The yield was 5.2 parts by weight or 80% of the theoretical. N-m-methylphenyl-N'-nitroguanidine melts at 125–126° C.

EXAMPLE XIV

*N-2,5-dimethylphenyl-N'-nitroguanidine*

Ten and nine-tenths parts of 2-amino-1,4-dimethylbenzene and 5 parts of N-methyl-N-nitroso-N'-nitroguanidine were added to 38 parts of 58% "aqueous" ethanol. This reaction mixture remained at room temperature for forty-two and a half hours, after which it was poured into 200 cc. of water. The N-2,5-dimethylphenyl-N'-nitroguanidine was recovered by filtration and washed with ether. The yield was 5.3 parts or 74.9% of the theoretical which melted at 161–162.7° C.

EXAMPLE XV

*N-2-methyl-5-isopropylphenyl-N'-nitroguanidine*

To 55 parts of 68% "aqueous" ethanol were added 11.8 parts of 2-amino-p-cymene and 5 parts of N-methyl-N-nitroso-N'-nitroguanidine. The reaction mixture was left at room temperature for seventy-two hours, after which it was poured into 20 parts of water. An oil separated at first, but after several days standing crystals formed. These crystals were filtered off and washed with ether. The yield was 26.8% of the theoretical and the N-2-methyl-5-isopropylphenyl-N'-nitroguanidine melted at 125–126° C.

EXAMPLE XVI

*N-m-bromophenyl-N'-nitroguanidine*

To a reaction medium of 50 parts of ether and 20 parts of water were added 15.5 parts of m-bromoaniline and 5 parts of N-methyl-N-nitroso-N'-nitroguanidine. After remaining at room temperature for fifteen days, the product was filtered off and washed with fresh ether. The yield of N-m-bromophenyl-N'-nitroguanidine was 63.7% of the theoretical. It melted at 179–182° C. but crystallization from 95% ethanol raised the melting point to 182–183° C.

EXAMPLE XVII

*N-o-chlorophenyl-N'-nitroguanidine*

Five parts of N-methyl-N-nitroso-N'-nitroguanidine and 11.5 parts of o-chloroaniline were added to 37 parts of 52% aqueous ethanol. The reaction mixture was refluxed for four and a half hours and then poured into 200 parts of water. The N-o-chlorophenyl-N'-nitroguanidine (M. P. 182–183° C.) was filtered off and washed with ether to give a yield of 31.5% of the theoretical. One crystallization from 95% ethanol raised the melting point to 187–188° C.

EXAMPLE XVIII

*N-m-chlorophenyl-N'-nitroguanidine*

To 40 parts of 56% aqueous ethanol were added 11.5 parts of m-chloroaniline and 5 parts of N-methyl-N-nitroso-N'-nitroguanidine. This reaction mixture was kept at 22° C. for twelve hours after which the crystalline product was filtered off and washed with ether. The N-m-chlorophenyl-N'-nitroguanidine melted at 161–163, yield 5.6 parts or 76.8% of the theoretical.

Examples XX and XXI show improvement in time of reaction with use of aqueous ethanol as a solvent in place of ether and water whilst reactants are the same in each reaction.

EXAMPLE XIX

*N-p-chlorophenyl-N'-nitroguanidine*

Eleven and a half parts of p-chloroaniline and 5 parts of N-methyl-N-nitroso-N'-nitroguanidine were added to 50 parts of ether and 20 parts of water. After the reaction mixture had stood at room temperature for eight days, the product was recovered by filtration and washed with fresh ether. The yield of N-p-chlorophenyl-N'-nitroguanidine was 5.57 parts or 77.8% of the theoretical. The melting point of 162–163° C. was raised to 167.5–168.5° C. by one crystallization from 95% ethanol.

EXAMPLE XX

*N-p-chlorophenyl-N'-nitroguanidine*

Eleven and one-half parts of p-chloroaniline were added to 50 parts of 65% "aqueous" ethanol along with 5 parts of n-methyl-N-nitroso-N'-nitroguanidine. This reaction mixture was allowed to stand twelve hours at room temperature. The reaction mixture at the end of this period of time contained crystals of the product. These crystals were filtered off and washed with ether to give 5.55 parts or 76% of the theoretical of N-p-chlorophenyl-N'-nitroguanidine (M. P. 166–167° C.)

EXAMPLE XXI

N-p-acetamidophenyl-N'-nitroguanidine

Nine parts by weight of p-aminoacetanilide and 5 parts of N-butyl-N-nitroso-N'-nitroguanidine were added to 75 parts of 50% "aqueous" ethanol. The mixture after standing for forty-eight hours, was filtered and washed thoroughly with water and ether. The fawn coloured N-p-acetamidophenyl-N'-nitroguanidine (M. P. 223° C. with decomposition) was obtained in 98.2% of the theoretical yield.

EXAMPLE XXII

N-m-hydroxyphenyl-$N^1$-nitroguanidine

METHOD A

To 9.8 parts of m-aminophenyl in a mixture of 50 parts of ether and 20 parts of water were added 5 parts of N-methyl-N-nitroso-$N^1$-nitroguanidine. This mixture was allowed to stand at room temperature for two days after which the crystals were filtered off and washed with water. The almost black crystals melted at 173–177° C., yield 66.3 per cent of the theoretical. One recrystallization from 95% ethanol raised the melting point to 178° C.

METHOD B

To 4.36 parts of m-aminophenol in 35 parts of 50% "aqueous" ethanol were added 5 parts of N-methyl-N-nitroso-$N^1$-nitroguanidine. This reaction mixture was left at room temperature for sixteen hours after which the crystals were removed by filtration and washed thoroughly with water. The product was obtained in 73.5% of the theoretical yield and melted at 175–177° C. One crystallization from 95% ethanol raised the melting point to 178° C.

EXAMPLE XXIII

N-p-hydroxyphenyl-$N^1$-nitroguanidine

Five parts of N-methyl-N-nitroso-$N^1$-nitroguanidine and 4.36 parts of p-aminophenol were added to 35 parts of 50% aqueous ethanol. This mixture was allowed to remain at room temperature for sixteen hours after which the product was filtered off and washed thoroughly with water. A gray crystalline product was obtained in 90% of the theoretical yield which melted at 236° C. with decomposition. This melting point varied with the rate of heating.

EXAMPLE XXIV

N-dl-α-phenylethyl-$N^1$-nitroguanidine

To 9.7 parts of dl-α-phenylethylamine dissolved in 35 parts of 50% aqueous ethanol were added 10 parts of N-methyl-N-nitroso-$N^1$-nitroguanidine portionwise over a period of forty minutes. During this time the reaction mixture was cooled with running water to maintain the temperature at 25–30° C. After this reaction period, the clear solution was allowed to stand overnight at room temperature. White rosettes of crystals separated which were filtered off after dilution of the reaction mixture with 100 parts of water. The dried crystals of N-dl-α-phenylethyl-$N^1$-nitroguanidine melted at 111.5–112° C., yield 81% of the theoretical. One crystallization from 96% ethanol (1.1 cc./g.) gave white crystals melting at 117–118° C.

EXAMPLE XXV

N-p-dimethylaminophenyl-$N^1$-nitroguanidine

Five and five-tenths parts of technical grade p-amino-dimethylaniline in 35 parts of 50% aqueous ethanol was treated with 5 parts of N-methyl-N-nitroso-$N^1$-nitroguanidine. The nitroso compound was added over a period of five minutes at room temperature. The evolution of gas had ceased within twenty minutes but the reaction mixture was allowed to stand at room temperature for a further period of sixteen hours before filtration. The dark purple crystalline product was washed thoroughly with water after filtration. It melted at 197° C., yield 63% of the theoretical.

Heretofore known N-substituted-N'-nitroguanidines, such as N-methyl, N-dimethyl, N-butyl, N-isobutyl, N-benzyl, and N-isoamyl-N'-nitroguanidines have been produced by the above same method.

EXAMPLE XXVI

N-Butyl-N'-nitroguanidine

An aqueous solution of 1.09 parts of n-butylamine in 5 parts of water was added over a period of fifteen minutes to 2 parts by weight of N-methyl-N-nitroso-N'-nitroguanidine with stirring. During the addition of the n-butylamine solution, the reaction mixture was cooled to about 10° in an ice-water bath. Vigorous gassing accompanied the addition of the amine solution. After complete addition of the amine, the reaction mixture was allowed to stand in the cold for a further three minutes. The white precipitate, which was present at this time was filtered off and washed with cold water. The product melted at 83.5° C. alone and on admixture with an authentic sample of N-n-butyl-N'-nitroguanidine this melting point was not changed. The yield was 51.5 per cent of the theoretical.

EXAMPLE XXVII

N-methyl-N'-nitroguanidine

When 1.1 mole equivalent of methylamine was reacted with N-methyl-N-nitroso-N'-nitroguanidine under the conditions specified in Example XIII, a 54 percent yield of N-methyl-N'-nitroguanidine (M. P. 159–161° C.) was obtained.

EXAMPLE XXVIII

N,N-dimethyl-N'-nitroguanidine

One and two mole equivalents of dimethylamine mixed with N-methyl-N-nitroso-N'-nitroguanidine under the conditions specified in Example XIII gave 59.5 and 55 per cent yields respectively of N,N-dimethyl-N'-nitroguanidine (M. P. 193.5–195° C.)

EXAMPLE XXIX

N-Isobutyl-N'-nitroguanidine

When 1.1 mole equivalent of isobutylamine was mixed with N-methyl-N-nitroso-N'-nitroguanidine under the conditions specified in Example XIII, a 55 per cent yield of N-isobutyl-N'-nitroguanidine (M. P. 118–119° C.) was obtained. One recrystallization from 40 per cent aqueous ethanol raised the melting point to 120–121° C.

EXAMPLE XXX

N-isoamyl-N'-nitroguanidine 1.1 mole equivalent of isoamylamine, when reacted with N-methyl-N-nitroso-N'-nitroguanidine under the conditions described in Example XIII, gave a 57 per cent yield of N-isoamyl-N'-nitroguanidine (M. P. 143–145° C.) One crystallization from 60% aqueous ethanol raised the melting point to 145–146° C.

EXAMPLE XXXI

N-benzyl-N'-nitroguanidine

Nine and six-tenths parts of benzylamine and 5.47 parts of N-ethyl-N-nitroso-N'-nitroguanidine were added to 35 cc. of 50% aqueous ethanol. A vigorous reaction occurred and the reaction mixture was cooled to 10° C. The temperature was maintained at 16° C.±4° C. throughout the ten minute period of vigorous reaction. The reaction mixture was then left at room temperature for one hour, after which it was poured into 200 parts of water and acidified with HCl(1:1) solution. The product was filtered off and washed with water. The yield of N-benzyl-N'-nitroguanidine (M. P. 179° C.) was 6.1 parts (92.5% of the theoretical). One crystallization from 95% ethanol raised the melting point to 182.5–183.5° C.

The following example gives by way of illustration the preparation of the above used reactants N-methyl-N-nitroso-N'-nitroguanidine, N-ethyl-N-nitroso-N'-nitroguanidine, and N-butyl-N-nitroso-N'-nitroguanidine.

EXAMPLE XXXII

N-methyl-N-nitroso-N'-nitroguanidine

Ten parts of methylnitroguanidine were dissolved in 30 parts of 70% HNO₃ (sp. gr. 1.42) and the solution was diluted with 100 parts of water. The resulting solution was cooled to 5° C. and 12.4 parts of sodium nitrite dissolved in 20 parts of water was added over a period of five minutes. The rate of addition was regulated to maintain the temperature at 5.8° C. During the addition period and for a further period of twenty minutes, the reaction mixture was mechanically stirred. The yellow crystalline product melted at 112–113° C. with decomposition. The yield was 90% of the theoretical. A sample was purified by crystallization from methanol (4.8 cc. per gram). The purified product melted at 118° C. with decomposition.

The embodiments of the invention in which an exclusive property or privilege is claimed are defined as follows:

1. The process which comprises reacting a compound of the general formula

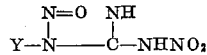

wherein Y is lower alkyl with a primary amine of the group consisting of lower alkyl, phenyl-lower alkyl, cycloalkyl, and monocyclic-carbocyclic-aromatic primary amines.

2. The process defined in claim 1 in which the primary amine is aniline.
3. The process defined in claim 1 in which the primary amine is lower primary alkylamine.
4. The process defined in claim 1 in which the primary amine is lower alkyl-phenylamine.
5. The process defined in claim 1 in which the primary amine is lower alkoxy phenylamine.
6. The process defined in claim 1 in which the primary amine is halogen phenylamine.

ARTHUR FERGUSON McKAY.

REFERENCES CITED

The following references are of record in the file of this patent:

UNITED STATES PATENTS

| Number | Name | Date |
|---|---|---|
| 1,547,815 | Jackman et al. | July 28, 1925 |
| 2,033,203 | McGill | Mar. 10, 1936 |

OTHER REFERENCES

Davis et al.: Proc. Am. Acad. Arts and Sci., vol. 61 (1926), pp. 441 to 450.

Davis et al.: J. Am. Chem. Soc., vol. 49 (1927), page 2303.

Davis et al.: J. Am. Chem. Soc., vol. 59 (1937), pp. 2113–2115.